United States Patent
Guha et al.

(10) Patent No.: US 11,151,165 B2
(45) Date of Patent: Oct. 19, 2021

(54) DATA CLASSIFICATION USING DATA FLOW ANALYSIS

(71) Applicant: Microsoft Technology Licensing, LLC, Redmond, WA (US)

(72) Inventors: Saikat Guha, Seattle, WA (US); Guoyu Hao, Sammamish, WA (US); Steven Peter Herbert, Woodinville, WA (US); Boris Asipov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 16/117,050

(22) Filed: Aug. 30, 2018

(65) Prior Publication Data

US 2020/0073994 A1    Mar. 5, 2020

(51) Int. Cl.
| | |
|---|---|
| *G06F 17/30* | (2006.01) |
| *G06F 16/28* | (2019.01) |
| *G06N 20/00* | (2019.01) |
| *G06N 3/08* | (2006.01) |

(52) U.S. Cl.
CPC ............. *G06F 16/285* (2019.01); *G06N 3/08* (2013.01); *G06N 20/00* (2019.01)

(58) Field of Classification Search
CPC .... G06F 16/285; G06F 16/906; G06F 16/221; G06F 16/9035; G06F 16/2471; G06F 16/283; G96F 16/35
See application file for complete search history.

(56) References Cited

U.S. PATENT DOCUMENTS

| | | | | |
|---|---|---|---|---|
| 6,003,027 A | * | 12/1999 | Prager | ..................... G06F 16/35 |
| 7,912,842 B1 | * | 3/2011 | Bayliss | ................. G06F 16/215 |
| | | | | 707/749 |
| 7,987,144 B1 | * | 7/2011 | Drissi | ................. G06K 9/6267 |
| | | | | 706/20 |

(Continued)

FOREIGN PATENT DOCUMENTS

WO    WO2020046448 A1 *    3/2020

OTHER PUBLICATIONS

Automatic Tag Recommendation Algorithms for Social Recommender Systems, ACM 2011, hereinafter Yang.*
Data Validation, false vectors correction and derived magnitudes calculation on PIV data; Measurement Science and Technology; 1997.*

(Continued)

*Primary Examiner* — Daniel A Kuddus
(74) *Attorney, Agent, or Firm* — Rainier Patents, P.S.

(57) ABSTRACT

Described herein is a system and method for utilizing data flow analysis to perform data classification with respect to a source dataset and a generated derived dataset. A flow confidence for a field is calculated using an adaptive algorithm in accordance with the action performed and the derived dataset. An associated derived confidence for a particular tag is calculated in accordance with an associated confidence and the flow confidence. When the associated derived confidence is greater than or equal to a first threshold, the particular tag is copied to the derived dataset. In some embodiments, when the associated derived confidence is less than or equal to a second threshold, the particular tag is not copied to the derived dataset. Otherwise an action to be taken is identified. A response to the action is received and the adaptive algorithm is modified in accordance with the received response.

20 Claims, 7 Drawing Sheets

(56) References Cited

U.S. PATENT DOCUMENTS

| | | | |
|---|---|---|---|
| 9,740,979 B2* | 8/2017 | Dubey | G06F 16/21 |
| 9,785,866 B2* | 10/2017 | Hua | G06K 9/6284 |
| 9,928,284 B2* | 3/2018 | Fapohunda | G06F 16/254 |
| 2008/0228749 A1* | 9/2008 | Brown | G06F 16/78 |
| 2015/0310166 A1* | 10/2015 | Gronemeyer | G06F 16/2365 |
| | | | 707/687 |
| 2015/0379429 A1* | 12/2015 | Lee | G09B 5/00 |
| | | | 706/11 |
| 2016/0188701 A1* | 6/2016 | Fapohunda | G06F 16/254 |
| | | | 707/749 |
| 2017/0177585 A1* | 6/2017 | Rodger | G06F 16/639 |
| 2017/0177589 A1* | 6/2017 | Shorman | G06Q 50/01 |
| 2018/0018590 A1* | 1/2018 | Szeto | G06F 21/6254 |
| 2018/0025011 A1 | 1/2018 | Aksionkin et al. | |
| 2018/0032671 A1* | 2/2018 | Mazloom | G16B 40/00 |
| 2018/0218207 A1* | 8/2018 | Guo | G06Q 10/06393 |
| 2018/0364979 A1* | 12/2018 | Guttmann | G06F 9/505 |
| 2019/0251469 A1* | 8/2019 | Wagstaff | G06N 20/00 |
| 2019/0318011 A1* | 10/2019 | Teran Guajardo | G06F 16/116 |
| 2019/0318202 A1* | 10/2019 | Zhao | G06K 9/6262 |

OTHER PUBLICATIONS

"Data Loss Prevention Using Automatic Tagging : Confidential", Retrieved from: https://web.archive.org/web/20180524124226/https://www.confidential.tech/, Retrieved Date: May 24, 2018, 6 Pages.

Mancini, John, "8 Reasons You Should Consider Automatic Classification and Automatic Metadata Tagging in SharePoint", Retrieved from: https://info.aiim.org/aiim-blog/newaiimo/2009/11/23/8-reasons-you-should-consider-automatic-classification-and-automatic-metadata-tagging-in-sharepoint, Nov. 23, 2009, 04 Pages.

"International Search Report and Written Opinion Issued in PCT Application No. PCT/US19/038805", dated Oct. 2, 2019, 13 Pages.

Song, et al., "Automatic Tag Recommendation Algorithms for Social Recommender Systems", In Journal of ACM Transactions on the Web (TWEB), vol. 5, Issue, Feb. 1, 2011, 31 Pages.

Sen, Shayak, et al., "Bootstrapping Privacy Compliance in Big Data Systems", May 1, 2014, 16 pages.

The Apache Software Foundation, "Apache/Atlas/Classification Propagation", last published Jun. 24, 2018, retrieved from "https://atlas.apache.org/ClassificationPropagation.html" on Aug. 29, 2018, 7 pages.

* cited by examiner

DATA CLASSIFICATION USING DATA FLOW ANALYSIS

BACKGROUND

Large organizations such as corporations, governments, etc. can store increasingly greater amounts of data. In some examples, data stores can ingest and process millions of files every day. The storage and/or use of this data can be governed by requirement(s) which can be, for example, self-imposed (e.g., corporate policy) and/or externally imposed (e.g., controlled by one or more governmental entity(ies)). In order to comply with these requirement(s), at least some portion(s) of the data can be classified based upon one or more classification schema(s).

SUMMARY

Described herein is a system utilizing data flow analysis to perform data classification, comprising: a processing system comprising a processor and a memory having computer-executable instructions stored thereupon which, when executed by the processor, cause the processing system to: receive a source dataset storing data in one or more fields, at least one of the fields having one or more tags, each tag having an associated confidence; generate a derived dataset by performing an action on the source dataset; for each of the one or more fields having at least one tag: calculate a flow confidence for the particular field using an adaptive algorithm in accordance with the action performed and the generated derived dataset; for each tag associated with the particular field, calculate an associated derived confidence for the particular tag in accordance with the associated confidence and the flow confidence; for each tag associated with the particular field: when the associated derived confidence is greater than or equal to a first threshold, copying the particular tag to the derived dataset; when the associated derived confidence is less than the first threshold and greater than the second threshold: identify an action to be taken with respect to the particular tag for the derived dataset; receive a response to the action to be taken with respect to the particular tag for the derived dataset; and modify the adaptive algorithm in accordance with the received response.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
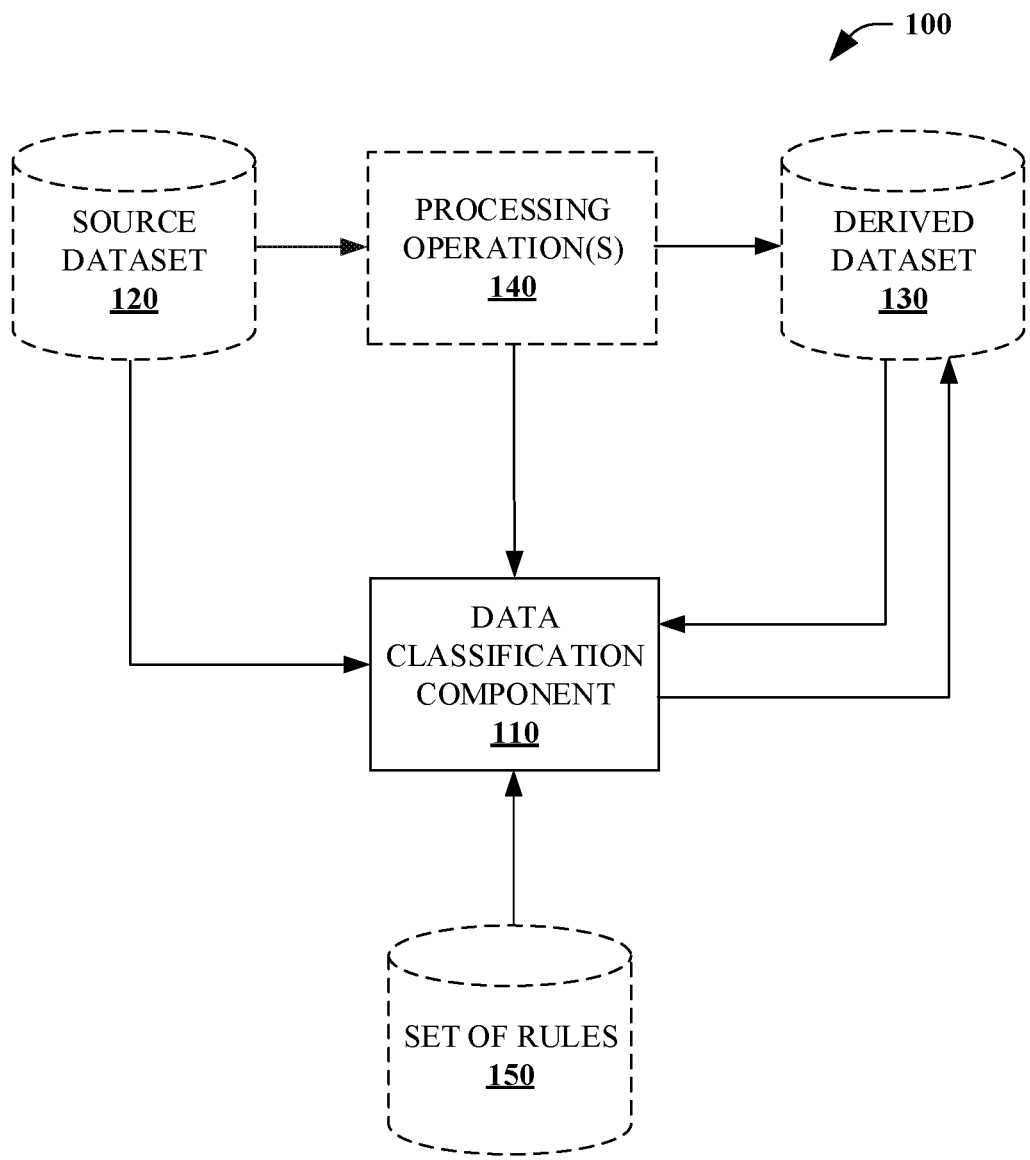
FIG. 1 is a functional block diagram that illustrates a system utilizing data flow analysis to perform data classification.

Various technologies pertaining to performing data classification using data flow analysis are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding performing data classification using data flow analysis. What follows are one or more exemplary systems and methods.

Aspects of the subject disclosure pertain to the technical problem of classifying data upon which data processing operation(s) have been performed. The technical features associated with addressing this problem involve receiving a source dataset storing data in field(s), at least one of the fields having tag(s), each tag having an associated confidence. A derived dataset is generated by performing action(s) on the source dataset. For each of the field(s) having at least one tag: calculating a flow confidence for the particular field using an adaptive algorithm in accordance with the action performed and the generated derived dataset; for each tag associated with the particular field, calculating an associated derived confidence for the particular tag in accordance with the associated confidence and the flow confidence; for each tag associated with the particular field: when the associated derived confidence is greater than or equal to a first threshold, copying the particular tag to the derived dataset; when the associated derived confidence is less than or equal to a second threshold, not copying the particular tag to the derived dataset; when the associated derived confidence is less than the first threshold and greater than the second threshold: identifying an action to be taken with respect to the particular tag for the derived dataset; receiving a response to the action to be taken with respect to the particular tag for the derived dataset (e.g., reviewed by a human reviewer); and modifying the adaptive algorithm in accordance with the received response. Accordingly, aspects of these technical features exhibit technical effects of reducing time spent by a human reviewer in order to classify data, reducing compliance costs associated with requirement(s), and/or reducing the likelihood of failing to comply with the requirement(s).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Compliance with governmental regulation(s) and/or business requirement(s) regarding storage and/or use of data can be difficult for entities such as corporations, governments, etc. In order to comply with these regulation(s) and/or requirement(s), all or portion(s) of data can be classified using one or more schemas. For example, data can be classified as being European Union General Data Protection Regulation (GDPR) sensitive or not.

Newly created resource(s) such as table(s), file(s), etc. are generally required to be classified and tagged. Classification and tagging can be needed even when the newly created resource(s) are derived from other resource(s) which have been classified and tagged. Performing processing operation(s) on data further complicates compliance with these regulation(s) and/or requirement(s). In some embodiments, processing operation(s) can result in some or all classification(s) flowing from a source dataset to a dataset derived from the source dataset. For example, copying a portion (e.g., column) from the source dataset can result in copying classification(s) associated with the field. However, in some embodiments, processing operation(s) can result in some or no classification(s) appropriately flowing from the source dataset to the derived dataset. For example, performing a hash operation on a field (e.g., column) from the source dataset can under certain circumstances (e.g., based upon the regulation(s) and/or requirement(s)) result in classification(s) associated with the field not flowing to the derived dataset (e.g., GDPR sensitive information removed by processing operation).

Described herein is a system and method for using data flow analysis to perform data classification. As noted, a significant portion of data (e.g., derived dataset) can be a result of transformation of other data (e.g., source dataset(s)), which have already classified. In some embodiments, when lineage of data is known with a high degree of confidence, it can be utilized by an adaptive algorithm to determine the classification of derived data from classification of source data automatically (e.g., without involving human labor). However, due to compliance requirement(s), regulation(s) and/or associated risk(s), in some embodiments, when the confidence calculated by the adaptive algorithm is not greater than or equal to a first threshold or less than or equal to a second threshold, the adaptive algorithm can identify action(s) (e.g., human input) to be taken to confirm or reject automatically generated classification(s). Response(s) to the action(s) can be utilized to modify the adaptive algorithm.

Referring to FIG. 1, a system utilizing data flow analysis to perform data classification 100 is illustrated. The system 100 can classify data upon which data processing operation(s) have been performed by calculating a flow confidence for field(s) using an adaptive algorithm. Tag(s) associated with the field(s) can be copied, not copied and/or an action identified to be taken with respect to particular tag(s). In some embodiments, each tag can have an associated confidence (e.g., numerical value in the range of zero (no confidence) to one (complete confidence)). The adaptive algorithm can be modified in accordance with a response received with respect to the identified action to be taken. Tag(s) can be utilized to search and identify data corresponding to particular tag(s) and/or particular record(s) within tagged dataset(s).

The system 100 includes a data classification component 110 that receives information regarding a source dataset 120 and information regarding a derived dataset 130. The derived dataset 130 is generated from the source dataset 120 using processing operation(s) 140. In some embodiments, a single source dataset 120 is employed to generated the derived dataset 130. In some embodiments, the derived dataset 130 can be generated based upon all or portions of a plurality of source datasets 120.

In some embodiments, the data classification component 110 can receive information regarding the processing operation(s) 140. In some embodiments, the information can comprise flow hint(s) which describe action(s) taken by the processing operation(s) 140 with respect to the source dataset 120. For example, the processing operation(s) 140 can include one or more database operation(s) (e.g., SQL operations such as select, join, insert, delete), arithmetic operation(s), logical operation(s) and/or bitwise operation(s).

The source dataset 120 and the derived dataset 130 store a collection of data. In some embodiments, the source dataset 120 and/or the derived dataset 130 comprise a relational database comprising one or more tables (e.g., relation(s)) of column(s) (e.g., attribute(s), field(s)) and row(s) (e.g., record(s)). Relationship(s) can logically connect tables to one another. In some embodiments, the source dataset 120 and/or the derived dataset 130 comprise object-oriented data structures, hierarchical data structures, and/or network data structures that store data according to schema(s).

In some embodiments, the source dataset 120 and the derived dataset 130 are based upon a common relational database and/or schema. In some embodiments, the source dataset 120 and the derived dataset 130 are based upon different relational databases and/or schema.

The information regarding the source dataset 120 received by the data classification component 110 can include organizational information, for example, name(s) of column(s) and/or name(s) within the schema. The information can further include tag(s) associated with portion(s) of the organizational information. "Tag" refers to relevant classification(s) associated with portion(s) of a particular dataset (e.g., column(s), table(s), and/or the dataset itself). In some embodiments, tag(s) are stored within the source dataset 120 and/or the derived dataset 130. In some embodiments, tag(s) are stored separately from the source dataset 120 and/or the derived dataset 130 (e.g., in a database and/or file).

In some embodiments, the information regarding the source dataset 120 comprises organizational information (e.g., column name) and tag(s) (e.g., classification(s)). In some embodiments, the information regarding the source dataset 120 comprises hierarchically and/or complexly structured data.

In some embodiments, tag(s) are applied to the source dataset 120 and/or the derived dataset 130 at one or more levels of granularity. For example, tag(s) can apply to the entire source dataset 120 and/or the entire derived dataset 130 and/or tag(s) can apply to specific portion(s) (e.g., column(s) and/or field(s)) of the source dataset 120 and/or the derived dataset 130.

In some embodiments, a tag comprises metadata including information based on a classification schema (e.g., personally sensitive information, highly sensitive information, no personally sensitive information). In some embodiments, a tag comprises a plurality of properties describing the tag and/or data associated with the tag, for example, a confidence level, how the tag was generated, a date and/or time of tag creation, a source of the generated tag, and/or a source of the associated data (e.g., search history).

In some embodiments, tag(s) are manually associated with the source dataset 120 based upon user input. For example, a user can review newly created resource(s), such as an additional column added to a table, and determined which classification(s), if any, apply to the newly created resource(s). The user can then apply tag(s) as appropriate to the newly created resource(s).

In some embodiments, tag(s) are automatically associated with the source dataset 120, for example, by a classifier. In some embodiments, an automated system can classify and/or tag the newly created resource(s) based on rule(s). However, these automated systems have conventionally not been generally successful in reliably classifying/tagging particular categories of data, for example, speech data. Unlike, an email address and/or a phone number, which can have known pattern(s), speech data can appear like an arbitrary sequence of bytes, thus making automated classification difficult.

In some embodiments, the data classification component 110 can perform a data flow analysis for each data processing operation in order to analyze whether output data (e.g., derived dataset 130) is derived directly or indirectly from data that was previously classified (e.g., source dataset 120). For example, a comparison can be made between at least a portion of the derived dataset 130 and at least a portion of the source dataset 120 in order to infer action(s) performed by the processing operation(s) 140. In instances in which the data classification component 110 determined that output data is derived directly or indirectly, the data classification component 110 can flow classification(s) from the source dataset 120 by calculating derived confidence for each tag (e.g., classification confidence) based on a flow confidence. In some embodiments, flow confidence is a numerical value in the range of zero (no confidence) to one (complete confidence). In some embodiments, tag(s) (e.g., classification(s)) that meet certain confidence threshold criteria are applied automatically. In some embodiments, human(s) are asked to confirm other classifications via "approval flow".

In some embodiments, the data classification component 110 can utilize an adaptive algorithm to calculate a flow confidence in accordance with the action performed and the generated derived dataset 130. In some embodiments, the adaptive algorithm can be trained using a machine learning process that utilizes various features present in datasets with the adaptive algorithm representing an association among the features. In some embodiments, the adaptive algorithm is trained using one or more machine learning algorithms including linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, Artificial Neural Network (ANN), and/or a Gradient Boost & Adaboost algorithm. The adaptive algorithm can be trained in a supervised, semi-supervised and/or unsupervised manner.

In some embodiments, the data classification component 110 can, for each of the field(s) of the source dataset having at least one tag, calculate a flow confidence for the particular field using an adaptive algorithm in accordance with the action performed and the generated derived dataset. For each tag associated with the particular field, an associated derived confidence for the particular tag can be calculated in accordance with the associated confidence and the flow confidence.

For each tag associated with the particular field, when the associated derived confidence is greater than or equal to a first threshold, copying the particular tag to the derived dataset. When the associated derived confidence is less than or equal to a second threshold, the particular tag is not copied to the derived dataset.

When the associated derived confidence is less than the first threshold and greater than the second threshold, an action to be taken with respect to the particular tag for the derived dataset can be identified. In some embodiments, the action to be taken is for a human reviewer to determine whether or not the particular tag should flow to the derived dataset 130 (e.g., providing the particular tag to the human reviewer). In some embodiments, the action to be taken is for an automatic process to review at least a portion of the data in the derived dataset 130 to determine whether or not the particular tag should flow to the derived dataset 130.

A response to the action to be taken with respect to the particular tag for the derived dataset can be received (e.g., reviewed by a human reviewer and/or automatic process). In some embodiments, the adaptive algorithm can be modified in accordance with the received response. In this manner, the adaptive algorithm can be adjusted to better calculate flow confidence resulting in action (e.g., human review and/or automatic process) being taken in fewer instances.

Thus, while in some embodiments, human labor may still be required to confirm or reject automatic classification when the calculated associated derived confidence is not high enough for the system 100 to apply the classification. However, in some embodiments, human labor can be significantly reduced, as only a small number of cases requires human labor, and even in these cases rather than requiring a human to classify, the proposed classification(s) can simply be confirmed or rejected.

In some embodiments, the data classification component 110 can modify the first threshold (e.g., value) and/or the second threshold (e.g., value) in accordance with the received response. Accordingly, the data classification component 110 can be adapted to more effectively analyze data flow in order to perform data classification. In some embodiments, the first threshold (e.g., value) and/or the second threshold (e.g., value) is a function of a compliance requirement and an associate risk (e.g., a cost/benefit based analysis).

In some embodiments, when classifications flow from a source dataset 120 to a derived dataset 130, conflicting tags may be applied to the derived dataset 130. In some instances, this can result in set(s) of classification(s) that don't make sense together. These cases can be handled by an optional set of rules 150 (e.g., hierarchical, customizable) that can be applied by the data classification component 110. In this manner, the data classification component 110 can determine resulting tag(s) by applying the set of rules 150. In some embodiments, property(ies) of the tag can be utilized by the data classification component 110 when applying the set of rules 150 to conflicting tags. In some embodiments, the data classification component 110 can identify an action to take with respect to the conflicting tags (e.g., human interaction), for example, based upon the set of rules 150.

In some embodiments, tag(s) can be applied to field(s) based upon pre-defined template(s). For example, a source dataset 120 can be based upon periodically generated data (e.g., hourly, daily, weekly) with the content changing, but the structure and corresponding tag(s) being static. Property (ies) associated with the tag(s) can reflect that the tag(s) were applied based upon pre-defined template(s). This information can be utilized when resolving conflicting tags. For example, more specifically applied tag(s) (e.g., applied by a human reviewer) can take precedent over more generally applied tag(s) (e.g., tag(s) based upon the pre-defined template(s)).

Figure 2:
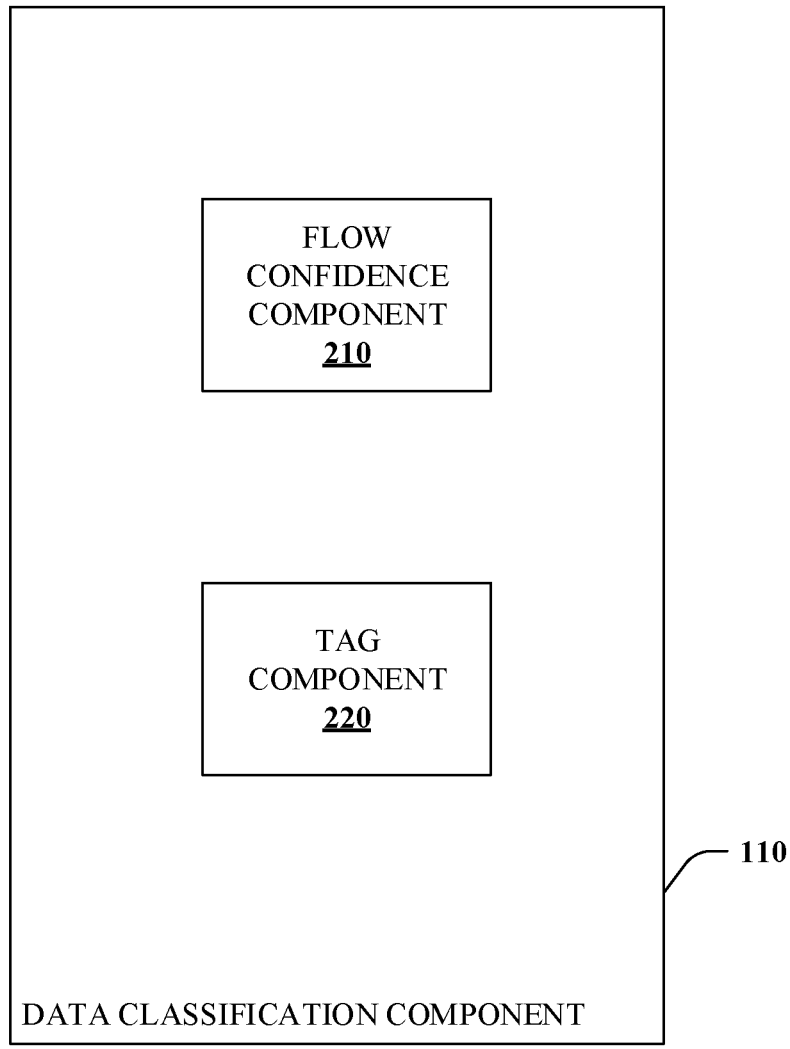
FIG. 2 is a functional block diagram that illustrates a data classification component.

Turning to FIG. 2, a data classification component 110 is illustrated. The data classification component 110 includes a flow confidence component 210 and a tag component 220.

As discussed previously with respect to FIG. 1, the data classification component 110 receives information regarding a source dataset 120 and information regarding a derived dataset 130. The derived dataset 130 is generated from the source dataset 120 using processing operation(s) 140. In some embodiments, the data classification component 110 can receive information regarding the processing operation(s) 140. The source dataset 120 can store data in field(s), with at least one of the fields have tag(s), each tag having an associated confidence.

The flow confidence component 210 can, for each of the field(s) having at least one tag, calculate a flow confidence for the particular field using an adaptive algorithm in accordance with the action performed and the generated derived dataset.

The tag component 220 can, for each of the field(s) having at least one tag: for each tag associated with the particular field, calculate an associated derived confidence for the particular tag in accordance with the associated confidence and the flow confidence. For each tag associated with the particular field: when the associated derived confidence is greater than or equal to a first threshold, the particular tag can be copied to the derived dataset. When the associated derived confidence is less than or equal to a second threshold, the particular tag is not copied to the derived dataset. When the associated derived confidence is less than the first threshold and greater than the second threshold: an action can be identified to be taken with respect to the particular tag for the derived dataset.

The data classification component 110 can receive a response to the action to be taken with respect to the particular tag for the derived dataset. In some embodiments, the data classification component 110 can further modify the adaptive algorithm of the flow confidence component 210 in accordance with the received response. In some embodiments, the data classification component 110 can modify a value of the first threshold and/or a value of the second threshold in accordance with the received response. Accordingly, the data classification component 110 can be adapted to more effectively analyze data flow in order to perform data classification.

FIGS. 3-6 illustrate exemplary methodologies relating to utilizing data flow analysis to perform data classification. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
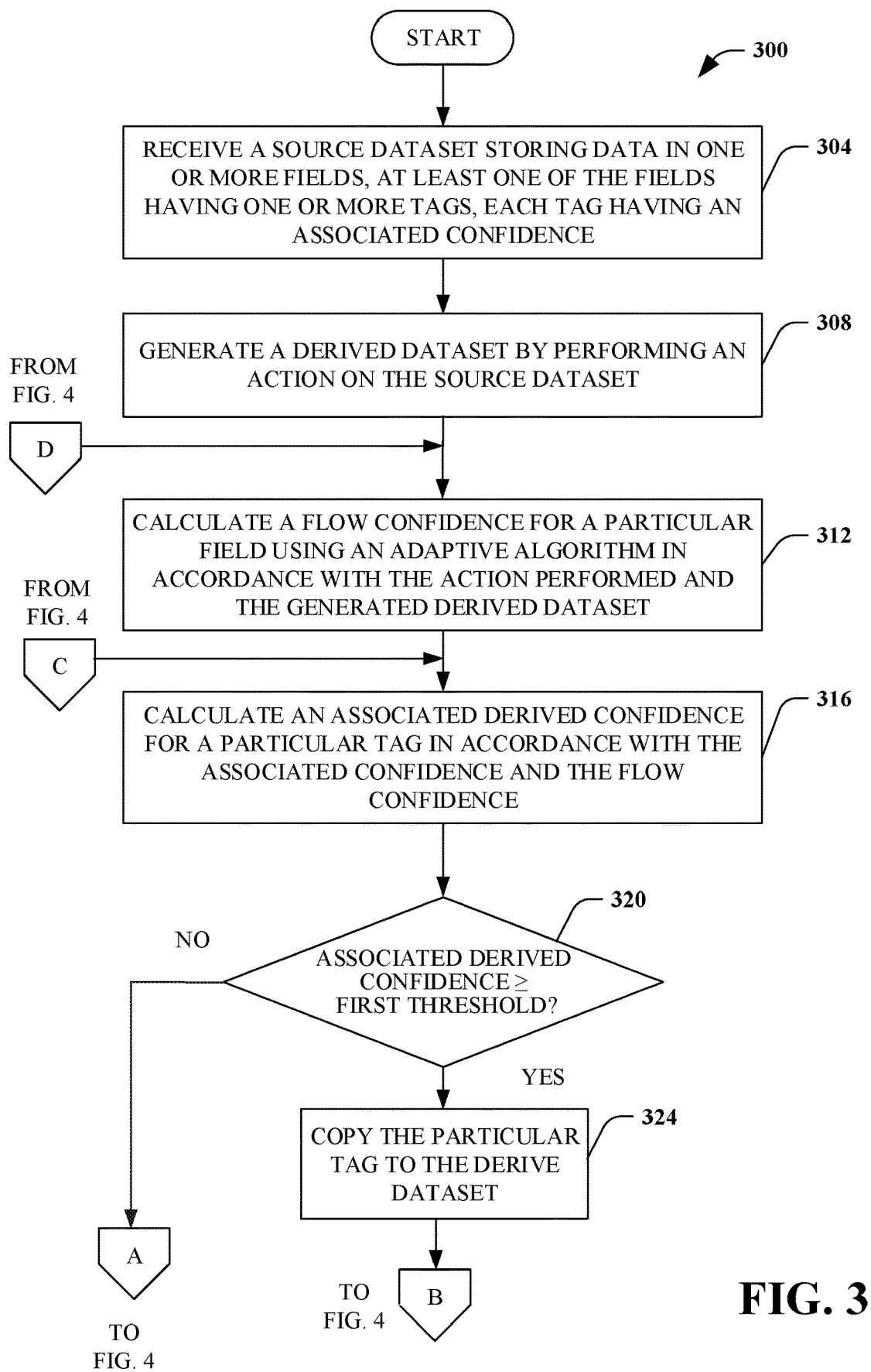
FIGS. 3 and 4 are flow charts that illustrate a method of utilizing data flow analysis to perform data classification.
Figure 4:
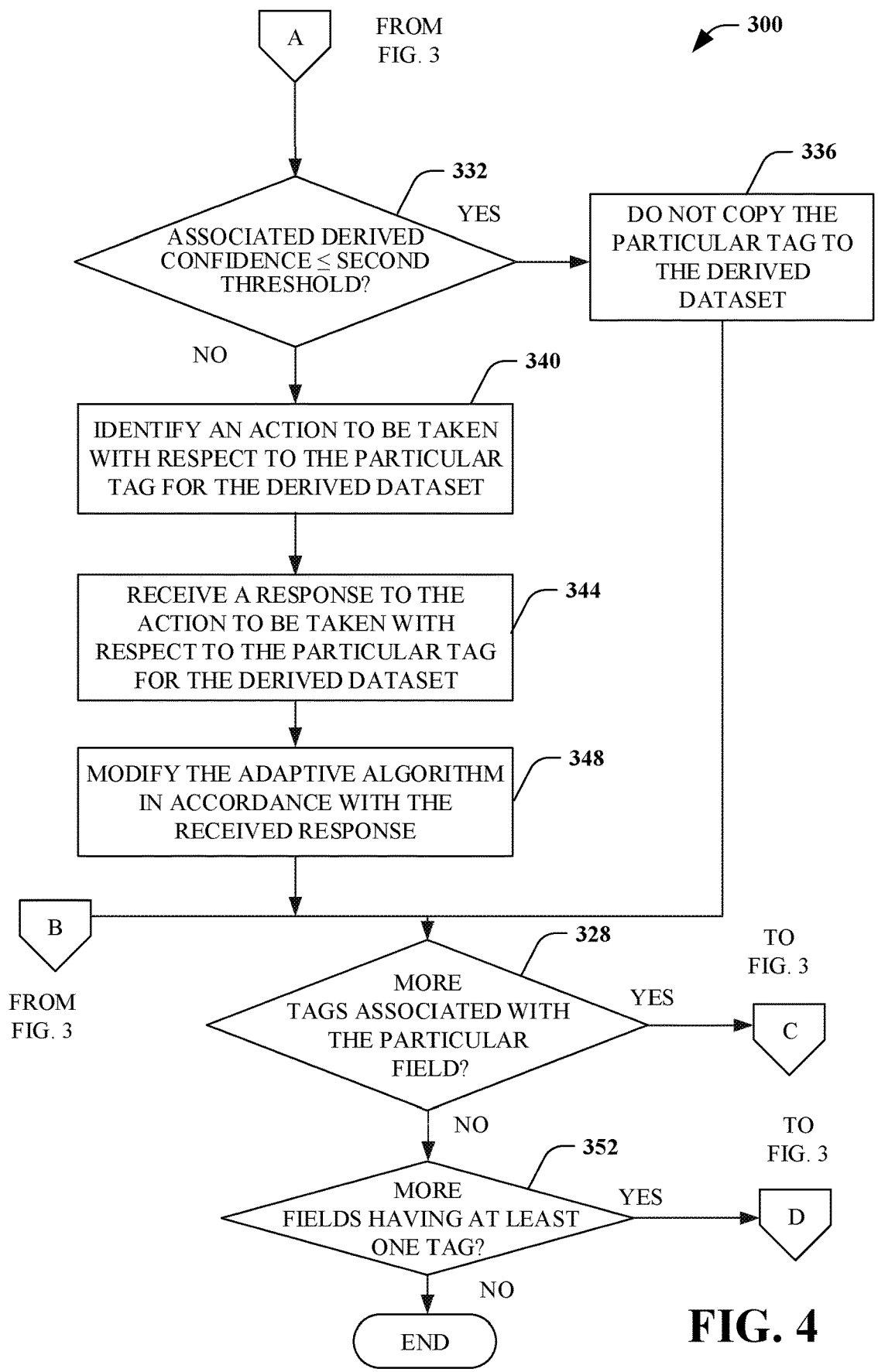

Referring to FIGS. 3 and 4, a method of utilizing data flow analysis to perform data classification 300 is illustrated. In some embodiments, the method 300 is performed by the system 100.

At 304, a source dataset is received with the source dataset storing data in one or more fields. At least one of the fields has one or more tags with each tag having an associated confidence.

At 308, a derived dataset is generated by performing an action on the source dataset. At 312, a flow confidence is calculated for a particular field using an adaptive algorithm in accordance with the action performed and the generated derived data set. At 316, an associated derived confidence is calculated for a particular tag in accordance with the associated confidence and the flow confidence.

At 320, a determination is made as to whether the associated derived confidence is greater than or equal to a first threshold. If the determination at 320 is YES, at 324, the particular tag is copied to the derived dataset and processing continues at 328. If the determination at 320 is NO, at 332, a determination is made as to whether the associated derived confidence is less than or equal to a second threshold. If the determination at 332 is YES, at 336, the particular tag is not copied to the derived dataset and processing continues at 328.

If the determination at 332 is NO, at 340, an action to be taken with respect to the particular tag for the derived dataset is identified. At 344, a response to the action to be taken with respect to the particular tag for the derived dataset is received. At 348, the adaptive algorithm is modified in accordance with the response.

At 328, a determination is made as to whether there are more tags associated with the particular field. If the determination at 328 is YES, processing continues at 316. If the determination at 328 is NO, at 352, a determination is made as to whether there are more fields having at least one tag. If the determination at 352 is YES, processing continues at 312. If the determination at 352 is NO, no further processing occurs.

Figure 5:
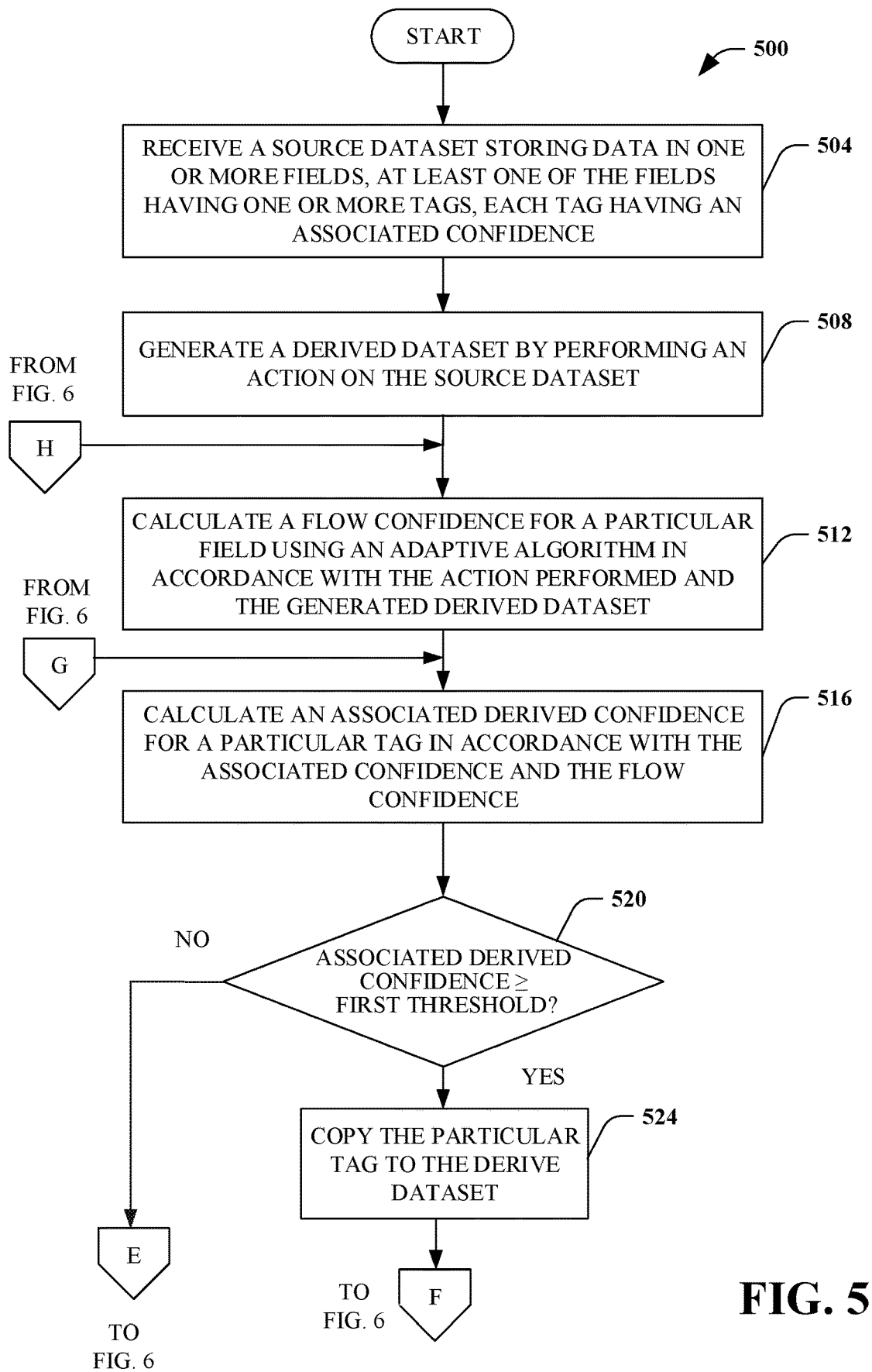
FIGS. 5 and 6 are flow charts that illustrate a method of utilizing data flow analysis to perform data classification.
Figure 6:
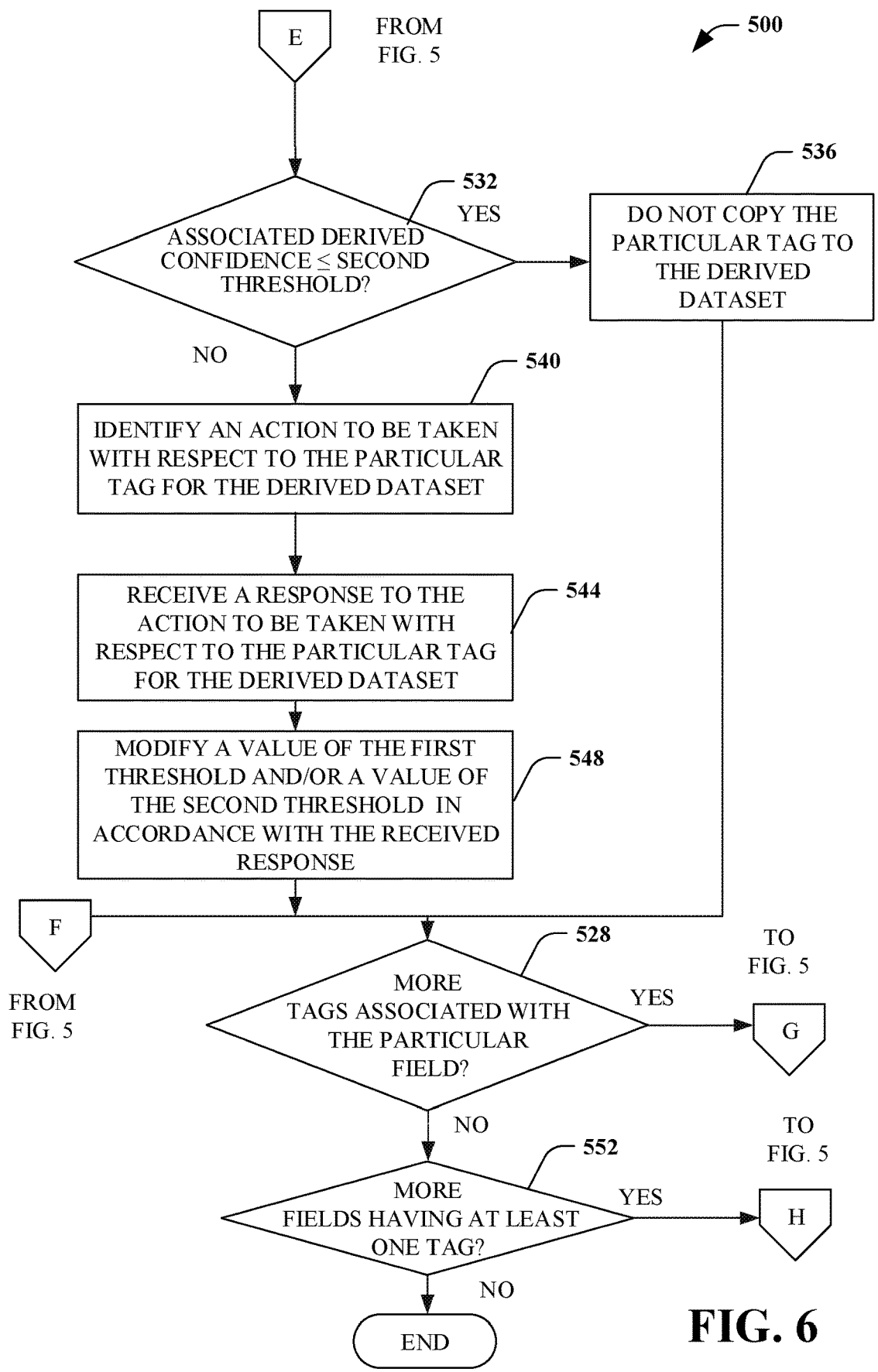

Turning to FIGS. 5 and 6, a method of utilizing data flow analysis to perform data classification 500 is illustrated. In some embodiments, the method 500 is performed by the system 100.

At 504, a source dataset is received with the source dataset storing data in one or more fields. At least one of the fields has one or more tags with each tag having an associated confidence.

At 508, a derived dataset is generated by performing an action on the source dataset. At 512, a flow confidence is calculated for a particular field using an adaptive algorithm in accordance with the action performed and the generated derived data set. At 516, an associated derived confidence is calculated for a particular tag in accordance with the associated confidence and the flow confidence.

At 520, a determination is made as to whether the associated derived confidence is greater than or equal to a first threshold. If the determination at 520 is YES, at 524, the particular tag is copied to the derived dataset and processing continues at 528. If the determination at 520 is NO, at 532, a determination is made as to whether the associated derived confidence is less than or equal to a second threshold. If the determination at 532 is YES, at 536, the particular tag is not copied to the derived dataset and processing continues at 528.

If the determination at 532 is NO, at 540, an action to be taken with respect to the particular tag for the derived dataset is identified. At 544, a response to the action to be taken with respect to the particular tag for the derived dataset is received. At 548, a value of the first threshold and/or a value of the second threshold is modified in accordance with the received response.

At 528, a determination is made as to whether there are more tags associated with the particular field. If the determination at 528 is YES, processing continues at 516. If the determination at 528 is NO, at 552, a determination is made as to whether there are more fields having at least one tag. If the determination at 552 is YES, processing continues at 512. If the determination at 552 is NO, no further processing occurs.

Described herein is a system utilizing data flow analysis to perform data classification, comprising: a processing system comprising a processor and a memory having computer-executable instructions stored thereupon which, when executed by the processor, cause the processing system to: receive a source dataset storing data in one or more fields, at least one of the fields having one or more tags, each tag having an associated confidence; generate a derived dataset by performing an action on the source dataset; for each of the one or more fields having at least one tag: calculate a flow confidence for the particular field using an adaptive algorithm in accordance with the action performed and the generated derived dataset; for each tag associated with the particular field, calculate an associated derived confidence for the particular tag in accordance with the associated confidence and the flow confidence; for each tag associated with the particular field: when the associated derived confidence is greater than or equal to a first threshold, copying the particular tag to the derived dataset; when the associated derived confidence is less than the first threshold and greater than the second threshold: identify an action to be taken with respect to the particular tag for the derived dataset; receive a response to the action to be taken with respect to the particular tag for the derived dataset; and modify the adaptive algorithm in accordance with the received response.

The system can include wherein the adaptive algorithm is trained using a machine learning process. The system can further include wherein the adaptive algorithm is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, an Artificial Neural Network (ANN), or a Gradient Boost & Adaboost algorithm. The system can include wherein the action comprises providing the particular tag to a human reviewer.

The system can further include wherein the action to be taken comprises an automatic process to review at least a portion of the data in the derived dataset to determine whether or not the particular tag should flow to the derived dataset. The system can include wherein calculating the flow confidence for the particular field using the adaptive algorithm in accordance with the action performed and the generated derived dataset is further based upon a flow analysis of the derived dataset and the source dataset. The system can further include when the associated derived confidence is less than the first threshold and greater than the second threshold: modifying at least one of a value of the first threshold or a value of the second threshold in accordance with the received response.

The system can include wherein at least one of the first threshold and the second threshold is a function of a compliance requirement and an associated risk. The system can further include performing conflict resolution between conflicting tags of the derived dataset using a set of rules.

Described herein is a method of utilizing data flow analysis to perform data classification, comprising: receiving a source dataset storing data in one or more fields, at least one of the fields having one or more tags, each tag having an associated confidence; generating a derived dataset by performing an action on the source dataset; for each of the one or more fields having at least one tag: calculating a flow confidence for the particular field using an adaptive algorithm in accordance with the action performed and the generated derived dataset; for each tag associated with the particular field, calculating an associated derived confidence for the particular tag in accordance with the associated confidence and the flow confidence; for each tag associated with the particular field: when the associated derived confidence is greater than or equal to a first threshold, copying the particular tag to the derived dataset; when the associated derived confidence is less than the first threshold and greater than the second threshold: identifying an action to be taken with respect to the particular tag for the derived dataset; receiving a response to the action to be taken with respect to the particular tag for the derived dataset; and modifying at least one of a value of the first threshold or a value of the second threshold in accordance with the received response.

The method can include wherein the adaptive algorithm is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, an Artificial Neural Network (ANN), or a Gradient Boost & Adaboost algorithm. The method can further include wherein the action comprises providing the particular tag to a human reviewer.

The method can include wherein the action to be taken comprises an automatic process to review at least a portion of the data in the derived dataset to determine whether or not the particular tag should flow to the derived dataset. The method can further include wherein calculating the flow confidence for the particular field using the adaptive algorithm in accordance with the action performed and the generated derived dataset is further based upon a flow analysis of the derived dataset and the source dataset.

The method can include when the associated derived confidence is less than the first threshold and greater than the second threshold: modifying the adaptive algorithm in accordance with the received response. The method can further include wherein at least one of the first threshold and the second threshold is a function of a compliance requirement and an associated risk. The method can include performing conflict resolution between conflicting tags of the derived dataset using a set of rules.

Described herein is a computer storage media storing computer-readable instructions that when executed cause a computing device to: receive a source dataset storing data in one or more fields, at least one of the fields having one or more tags, each tag having an associated confidence; generate a derived dataset by performing an action on the source dataset; for each of the one or more fields having at least one tag: calculate a flow confidence for the particular field using an adaptive algorithm in accordance with the action performed and the generated derived dataset; for each tag associated with the particular field, calculate an associated derived confidence for the particular tag in accordance with the associated confidence and the flow confidence; for each tag associated with the particular field: when the associated derived confidence is greater than or equal to a first threshold, copying the particular tag to the derived dataset; when the associated derived confidence is less than the first threshold and greater than the second threshold: identify an action to be taken with respect to the particular tag for the derived dataset; receive a response to the action to be taken with respect to the particular tag for the derived dataset; and modify the adaptive algorithm in accordance with the received response.

The computer storage media can include wherein the action to be taken comprises at least one of review by a human reviewer or an automatic process to review at least a portion of the data in the derived dataset to determine whether or not the particular tag should flow to the derived dataset. The computer storage media can further include wherein calculating the flow confidence for the particular field using the adaptive algorithm in accordance with the action performed and the generated derived dataset is further based upon a flow analysis of the derived dataset and the source dataset.

Figure 7:
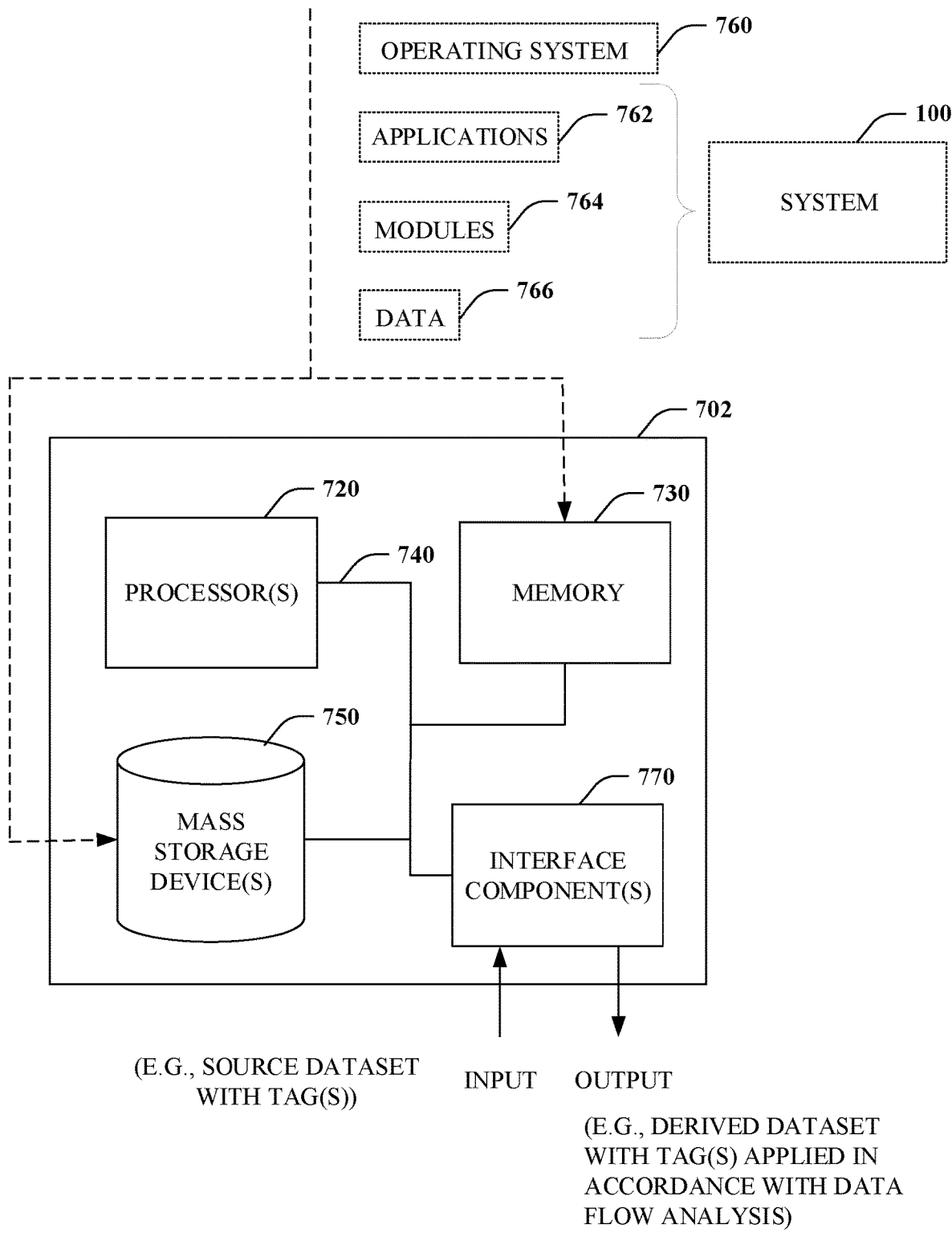
FIG. 7 is a functional block diagram that illustrates an exemplary computing system.

With reference to FIG. 7, illustrated is an example processing system, general-purpose computer or computing device 702 (e.g., mobile phone, desktop, laptop, tablet, watch, server, hand-held, programmable consumer or industrial electronics, set-top box, game system, compute node, etc.). For instance, the computing device 702 may be used in a system utilizing data flow analysis to perform data classification 100.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In accordance with one particular embodiment, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
at least one hardware processor; and
a memory having computer-executable instructions stored thereupon which, when executed by the at least one hardware processor, cause the system to:
obtain a particular derived dataset, the particular derived dataset having been generated by transforming a particular source dataset into the particular derived dataset, the particular source dataset storing data in one or more fields including a first field having a first tag confidence that a first tag applies to information in the first field;
provide transformation information regarding one or more processing operations used to transform the particular source dataset into the particular derived dataset to an adaptive algorithm that is trained to determine flow confidences, the flow confidences comprising numerical values reflecting confidence that tags flow from source datasets to derived datasets obtained by transforming the source datasets;
calculate a first flow confidence for the first field using the adaptive algorithm in accordance with the transformation information, the first flow confidence comprising a first numerical value reflecting a likelihood that the first tag flows from the particular source dataset to the particular derived dataset during the one more processing operations that transform the particular source dataset into the particular derived dataset;
calculate a derived confidence for the first tag in accordance with the first tag confidence and the first flow confidence;
when the derived confidence is greater than or equal to a first threshold, automatically associate the first tag with the particular derived dataset; and
when the derived confidence is less than the first threshold and greater than a second threshold:
identify a second action to be performed with respect to the first tag for the particular derived dataset;
receive a response to the second action with respect to the first tag for the particular derived dataset; and
modify the adaptive algorithm in accordance with the received response.

2. The system of claim 1, wherein the adaptive algorithm is trained using a machine learning process.

3. The system of claim 1, wherein the adaptive algorithm is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, an Artificial Neural Network (ANN), or a Gradient Boost & Adaboost algorithm.

4. The system of claim 1, wherein the second action comprises providing the first tag to a human reviewer.

5. The system of claim 1, wherein the second action comprises an automatic process to review at least a portion of the particular derived dataset to determine whether or not the first tag should flow to the particular derived dataset.

6. The system of claim 1, wherein the computer-executable instructions, when executed by the at least one hardware processor, cause the system to:
calculate the first flow confidence for the first field using the adaptive algorithm based at least upon a flow analysis of the particular derived dataset and the particular source dataset.

7. The system of claim 1, wherein the computer-executable instructions, when executed by the at least one hardware processor, cause the system to:
when the derived confidence is less than the first threshold and greater than the second threshold, modify at least one of a value of the first threshold or a value of the second threshold in accordance with the received response.

8. The system of claim 1, wherein the flow confidences and the first flow confidence range between zero and one.

9. The system of claim 1, wherein the computer-executable instructions, when executed by the at least one hardware processor, cause the system to:
perform conflict resolution between conflicting tags of the particular derived dataset using a set of rules.

10. A method, comprising:
obtaining a particular derived dataset, the particular derived dataset having been generated by transforming a particular source dataset into the particular derived dataset via one or more processing operations, the particular source dataset storing data in one or more fields including a first field to which a first tag applies, the first tag indicating that the first field has a first classification;
providing transformation information regarding the one or more processing operations used to transform the particular source dataset into the particular derived dataset to an adaptive algorithm that is trained to determine flow confidences, the flow confidences comprising numerical values reflecting confidence that tags flow from source datasets to derived datasets obtained by transforming the source datasets;
determining a first flow confidence for the first field using the adaptive algorithm, the first flow confidence comprising a first numerical value reflecting a likelihood that the first classification flows from the particular source dataset to the particular derived dataset during the one or more processing operations that transform the particular source dataset into the particular derived dataset;
determining a derived confidence for the first tag in accordance with the flow confidence;
in an instance when the derived confidence is greater than or equal to a first threshold, automatically associating the first tag with the particular derived dataset; and
in another instance when the derived confidence is less than the first threshold:
identifying a second action to be performed with respect to the first tag for the particular derived dataset;
receiving a response to the second action with respect to the first tag for the particular derived dataset; and
modifying the first threshold in accordance with the received response.

11. The method of claim 10, wherein the adaptive algorithm is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, an Artificial Neural Network (ANN), or a Gradient Boost & Adaboost algorithm.

12. The method of claim 10, wherein the second action comprises providing the first tag to a human reviewer.

13. The method of claim 10, wherein the second action comprises an automatic process to review at least a portion of the particular derived dataset to determine whether or not the first tag should flow to the particular derived dataset.

14. The method of claim 10, wherein determining the first flow confidence is based at least upon a flow analysis of the particular derived dataset and the particular source dataset.

15. The method of claim 10, further comprising:
in the another instance, modifying the adaptive algorithm in accordance with the received response.

16. The method of claim 10, wherein the first threshold is determined as a function of a compliance requirement and an associated risk.

17. The method of claim 10, further comprising performing conflict resolution between conflicting tags of the particular derived dataset using a set of rules.

18. A computer storage device storing computer-readable instructions that, when executed, cause a computing device to:
obtain a derived dataset, the derived dataset having been generated by transforming a source dataset into the derived dataset by performing a first action on the source dataset, the source dataset storing data in one or more fields including a first field having a first tag confidence that a first tag applies to the first field, the first tag indicating that the first field has a first classification;
determine a flow confidence for the first field using an adaptive algorithm in accordance with the first action performed on the source dataset, the flow confidence reflecting a likelihood that the first action resulted in the first classification flowing from the source dataset to the derived dataset, wherein the adaptive algorithm is trained using at least one of a linear regression algorithm, a logistic regression algorithm, a decision tree algorithm, a support vector machine (SVM) algorithm, a Naive Bayes algorithm, a K-nearest neighbors (KNN) algorithm, a K-means algorithm, a random forest algorithm, a dimensionality reduction algorithm, an Artificial Neural Network (ANN), or a Gradient Boost & Adaboost algorithm;
determine a derived confidence for the first tag in accordance with the first tag confidence and the flow confidence;
in an instance when the derived confidence is greater than or equal to a first threshold, associate the first tag with the derived dataset; and
in another instance when the derived confidence is less than the first threshold, determine whether to associate the first tag with the derived dataset based at least on input from a human reviewer or an automatic process.

19. The computer storage device of claim 18, wherein the input is received from the human reviewer.

20. The computer storage device of claim 18, wherein the computer-readable instructions, when executed, cause the computing device to:
perform a flow analysis of the derived dataset and the source dataset; and
determine the flow confidence based at least on the flow analysis.

* * * * *